Jan. 1, 1935.   M. A. SHARAR   1,986,684
PROTRACTOR
Filed June 22, 1932   2 Sheets-Sheet 1
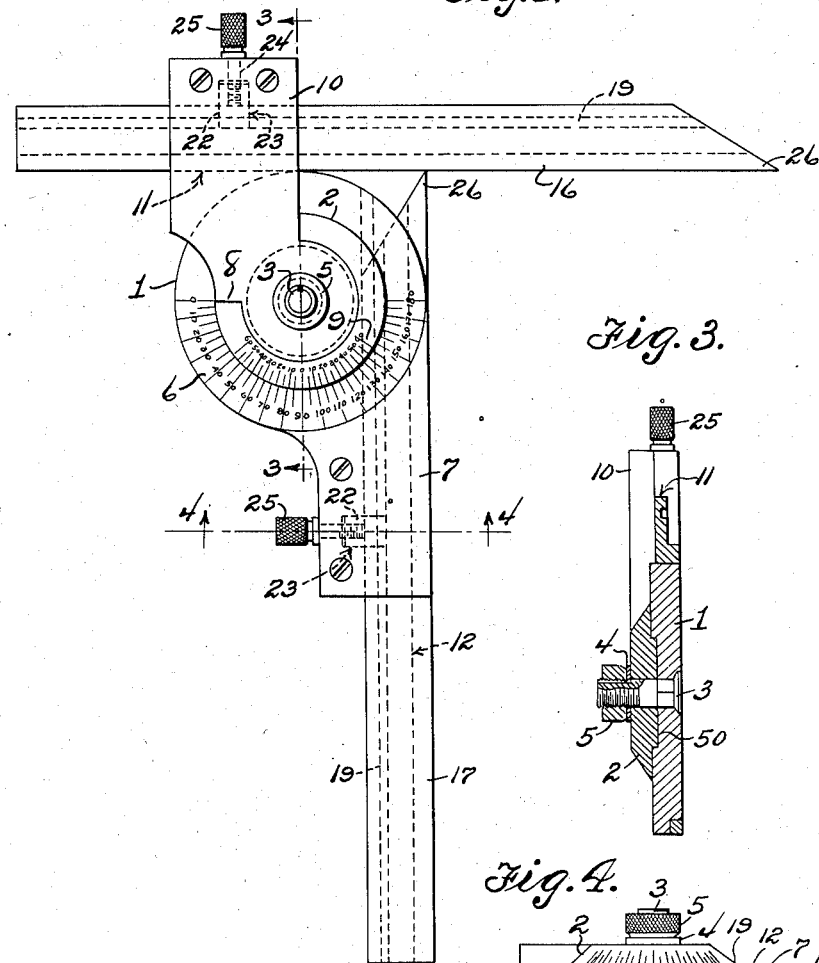
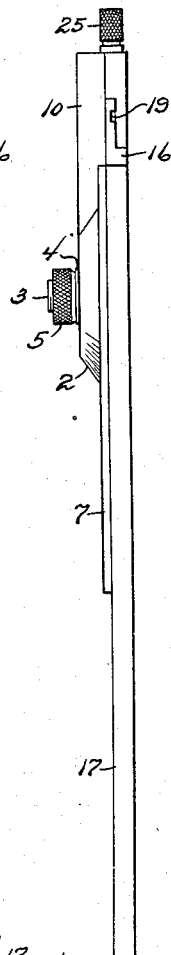
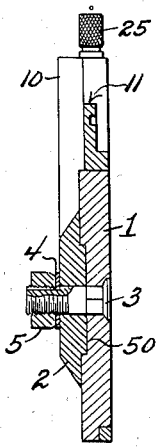
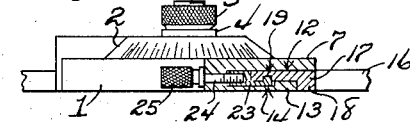
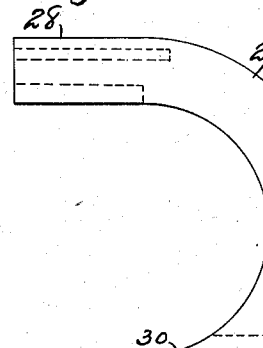
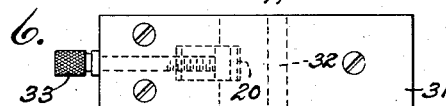
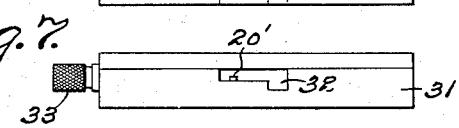
Martin A. Sharar
INVENTOR
BY Victor J. Evans & Co.
ATTORNEY Jan. 1, 1935.　　　M. A. SHARAR　　　1,986,684
PROTRACTOR
Filed June 22, 1932　　　2 Sheets-Sheet 2
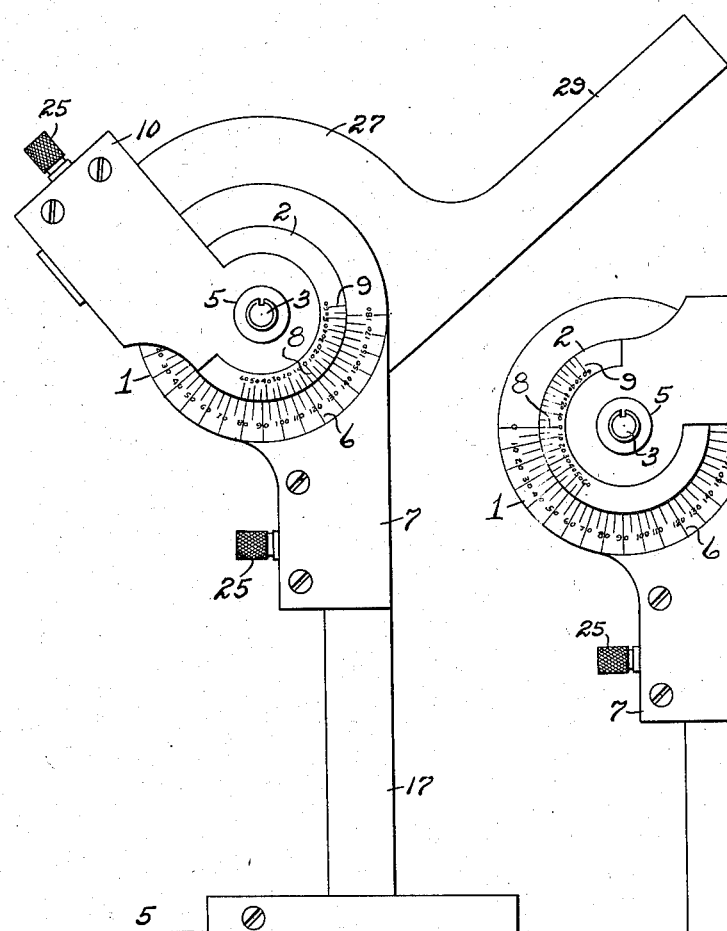
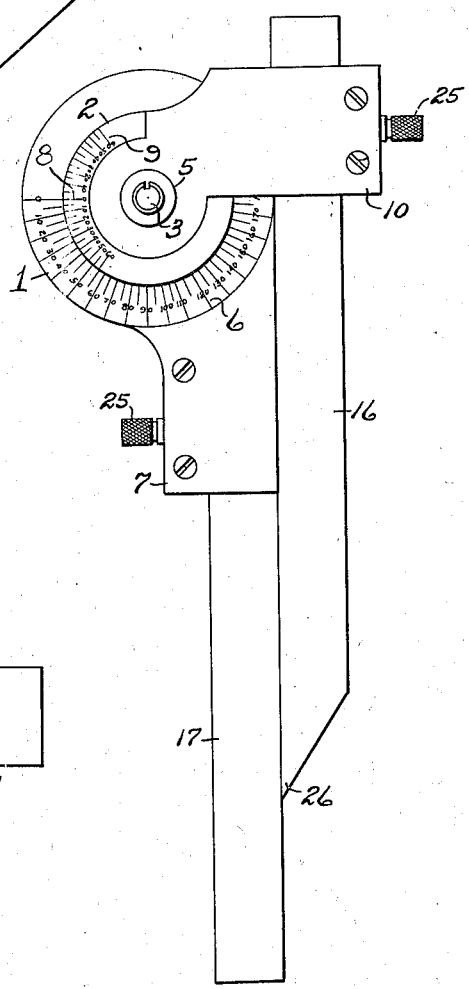
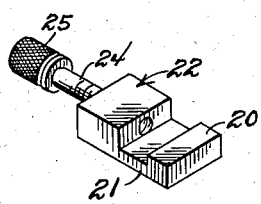
Martin A. Sharar
INVENTOR
BY Victor J. Evans & Co.
ATTORNEY Patented Jan. 1, 1935

1,986,684

UNITED STATES PATENT OFFICE 1,986,684

PROTRACTOR

Martin A. Sharar, Springdale, Pa., assignor of one-half to Sidney O. Sharar, Pittsburgh, Pa.

Application June 22, 1932, Serial No. 618,742

1 Claim. (Cl. 33—97)

This invention has reference to bevel protractors designed for all classes of work where angles are to be laid out or measured.

An object of the invention is to provide an instrument by means of which various angles and depths may be determined, the instrument being capable of adjustment for a wide variety of uses and in reality the instrument comprises, in combination, a square, as well as a bevel protractor, and is positively capable of performing all of the required functions obtained by such instruments.

Another object is the provision of a protractor which may be laid flat upon a drawing, sketch or object and adjusted with respect to the desired angle or degree, and whereby the lines thus obtained may be scribed along the instrument evenly and unbrokenly, or in other words, whereby no offset or irregular surfaces are presented by the instrument to interfere with the scribing operation.

A further and important object is the provision of a combined bevel protractor which is characterized by simplicity in construction, ease in accurate adjustment and reliability and efficiency in practical use.

To the attainment of the foregoing the invention consists in the improvement hereinafter described and definitely claimed.

In the drawings:

Figure 1 is a plan view of the present invention.

Figure 2 is an edge view thereof.

Figure 3 is a sectional view aproximately on the line 3—3 of Figure 1.

Figure 4 is a transverse sectional view on the line 4—4 of Figure 1.

Figure 5 is a plan view of an attachment for the instrument.

Figure 6 is a plan view of the edge plate or head which may be also employed.

Figure 7 is a side elevation thereof.

Figure 8 is a plan view of the instrument showing the same folded to bring the blades thereof against each other.

Figure 9 is a plan view showing the instrument provided with the attachment disclosed by Figure 5 and with the head or edge plate shown by Figures 6 and 7.

Figure 10 is a detail perspective view of the slidable latch.

The head of my improvement comprises an inner disc 1 and an outer and smaller disc 2. The smaller disc 2 is arranged on the center of the outer face of the inner disc 1. These discs are centrally fastened together to permit of the relative movement of one disc on the other disc. The fastening means is preferably in the nature of a bolt 3 that passes centrally through both of the discs 1 and 2, the said disc 1, from its outer and threaded end being provided with a slot for a tongue of a split spring washer 4 that is compressed against the outer disc 2 by a peripherally knurled nut 5 that is screwed on the bolt 3. The bolt, at the portion of its shank that passes through the disc 1 is preferably square and provided with other means for holding the bolt from turning and the head of the bolt is embedded in a recess provided therefor in the outer and flat face of the disc 1.

The outer and normally visible face of the disc 1 is beveled from its body to its periphery and on this surface there are scales or graduations 6 which, in the showing of the drawings and for the purposes of this invention, include 180 degrees, the said graduations appearing upon the normally lower face of the said disc or more strictly speaking, opposite the edge of the disc from which is projected an arm 7. The arm 7 has what I will term its outer edge straight and which straight edge terminates in a line with the periphery of the disc 1.

The disc 2 also has its outer or normally visible face beveled from its body to its outer perimeter and this beveled portion carries a zero mark 8 included in a scale 9, the zero mark being adapted to register with the graduations 6, while the graduations of the scale 9 enable one to determine the fractional parts by minutes of the subdivisions of said scale having the graduations 6.

The disc 2 is formed on one of its sides with an arm extension 10, one of whose edges is in a plane with the axial center of the disc and the said arm being of the same width as the arm 7, has its opposite edge projecting beyond the periphery of the disc 1. The inner end of this arm, on which the disc 2 is provided, has its rear face cut away or notched to provide both a beveled and flat surface that rides on the beveled and on the straight outer and normally visible face of the disc 1, and the outer and flat face of the arm 10 is arranged flush with the outer or rear face of the arm 7.

The arm 7, from its outer straight and active edge, is slotted longitudinally and the arm 10 from and outward of the portion thereof in a line with the periphery of the disc 1 is slotted transversely. As the walls provided by these slots are similar, I have not deemed it necessary to illustrate the slot in the arm 10, but have merely indicated the same by the character 11. The longitudinal slot or opening 12 in the arm 7 has its outer wall, or the wall adjacent to its outer face straight throughout the length thereof, but the lower wall provided by the said slot is disposed inward of the said straight edge of the arm and the outer portion of the wall is projected to provide a longitudinally extending rib 13. This rib affords the said lower wall provided by the slot with a depressed portion or channel 14, the said channel terminating with the inner straight wall of the slot or opening. By providing the arms with this particular form of slots or openings there may be easily passed through the said slots or openings to engage with the walls thereof the blade 16 that passes through the slot or opening 11 in the arm 10 and the blade 17 that passes through the longitudinal slot or opening in the arm 7. Both of the blades are of a similar construction and are of substantially the same length and each of the blades has its outer straight edge formed with a depending rib 18 whose inner shoulder contacts with the outer face of the rib 13 and the inner reduced and flat face of the said blade rests on the inner face of the rib 13. The under face of the reduced portions of the blades 16 and 17 are grooved longitudinally, as at 19. The grooves 19 receive therein tongues 20 that project from the lower and reduced ends 21 of blocks 22. Each of the blocks is received in the slots 11 and 12 at the rear of the blades 16 and 17 and are also received in substantially rectangular recesses 23 in the said arms 7 and 10. The blocks have central threaded openings therein for the reception of the threaded ends of shanks 24 that pass through openings on the inner side of the arm 7 and the outer end of the arm 10. The shanks 14 have outer knurled heads 25, respectively, and by manipulating the heads the threaded shanks will cause the clamping blocks 22 to move into the pockets provided therefor so that their lips 20 will draw upon the inner shoulders afforded by the grooves 19 in the said blades for tightly clamping the blade in the arm and for arranging the outer face of the blade 17 flush with the outer edge of the arm 7 and for likewise positively holding the blade 16 at a right angle with respect to the arm 10. Obviously by slightly unscrewing the bolts the blades 16 and 17 may be moved longitudinally through the arms 7 and 10.

With a construction as above described it is to be noted that the inner faces of the arms of the head or disc 1 are straight and are flush with each other, so that the instrument may rest upon a flat surface of either an object or a drawing sheet and by merely regulating the nut 5 either of the blade carrying arms may be adjusted to any desired angle of inclination with respect to the other arm and then the end of one arm is brought into contact with the edge of the other arm so that a continuous surface is provided by the instrument for scribing an angle upon the object or paper.

It will be further noted that after the arms and the blades are adjusted and the nut 5 is screwed home on the bolt 3 the arms and blades will be retained in such adjusted relation so that the instrument can be taken from place to place and the angle lines may be scribed upon other objects or the instrument may be placed upon a finished object to positively ascertain that the angle of the sides or walls thereon are as determined or specified.

As disclosed by Figure 8 of the drawings the blade 17 may be moved through the arm 7 a sufficient distance to permit of the arm 10 and the blade 16 carried thereby being swung to cause the blade 16 to lie against the blade 17.

The outer ends of the blade 17 are beveled to provide the same with points 26 so that the instrument thus provides a pair of dividers or steppers and as the end edges of the blades are cut at angles of 45° the ends of the said blades may be also employed for scribing articles with 45° angle marks.

In instances where it is desired that one of the blades be retained offset or at an angle with respect to the other blade an attachment such as disclosed by Figure 5 of the drawings is employed. This attachment comprises a metal member having a central, approximately half-circular portion 27 from whose ends there are projected oppositely directed arms 28 and 29, the arm 28 being of a less length than the arm 29. These arms are provided with slots or grooves of a construction similar to those previously described so that blades, similar to the blades 16 and 17 may be interfitted with the arms 28 and 29 respectively. In the showing of Figure 9 the arm 28 is received through the slot or opening 11 in the arm 10 of the instrument and clamped therein. The inner wall provided by the arched portion 27 peripherally engages with the disc 1. A determined angle may be had by turning the arm 10 on the head 1, and the shoulder 30, at the juncture of the said rounded portion 27 of the arm 29 contacting with the arm 7 will limit the angular adjustment of the arm 29. A blade is inserted in the slot or opening 19 in the arm 7, and on this blade there is adjustably arranged an edge plate or head 31. The edge plate or head has a central substantially L-shaped slot 32 therethrough to receive therein the shouldered portion of the blade 16 or 17. Partly projecting into this slot 32 there is the lip 20' of a latching block similar to the latching block 22 and this lip is designed to be received in the groove 19 of the blade. The block is operated by an adjusting screw whose milled head 33 is arranged along one of the ends of the said edge plate or head. The edge plate or head, when properly adjusted on the blade, holds the blade square at the edge of any object. A blade may, of course, be attached to the arm 28 and the head or edge plate may be transferred from the blade on the arm 29 onto the last-named blade, thus making it possible to scribe a right or a left angle with one setting of the dial.

It is to be noted that the improvement is simple and compact. With the device, tapered or round objects which are very small in diameter can be measured because both blades can be brought face to face and said blades cannot pass over each other. The protractor may be also employed for measuring long narrow tapers as the blades may be swung with respect to each other approximately a radius of 135 degrees. Because of its flat back surface the same can be arranged on and snugly engage with an object to be scribed or measured. The device may be employed as a rule, as a dividing implement as well as for marking equidistantly spaced points through the medium of the pointed ends of the blade and can be employed in a great many other connections. While I have illustrated a satisfactory embodiment of my improved device, my features of invention are capable of extended application and I do not wish to be restricted to the precise details herein shown and described.

As disclosed by Figure 3 the disc 2 of the protractor has its inner flat face provided with an annular boss 50 which is received in an annular groove in the outer face of the disc 1 so that the said disc 2 is at all times retained from movement on the disc 1.

Having described the invention, I claim:

A protractor comprising two concentrically relatively rotatable discs having a common axis concentric thereto, one of said discs being larger than the other and being provided with a degree scale, the smaller disc having a line to register with the degree scale and likewise being provided with a minute scale, said larger disc carrying an arm whose outer edge is in a line with the margin of the disc, the smaller disc also carrying an arm whose outer portion is thickened on one of its faces to permit of the said face being arranged flush with the rear face of the larger disc and the arm carried thereby, both of said arms having longitudinal openings affording inner shoulders, the opening in the arm of the larger disc being extended through the outer end thereof and that in the arm of the smaller disc being arranged transversely therethrough, a member having oppositely extending arms and an arched portion connecting the arms, one of said arms being received through the transverse groove in the smaller disc carrying arm, means for removably securing the same in said arm, and the arms of the said member being slotted for the reception of blades, a blade removably secured in the arm of the larger disc member, means removably securing the blade therein, a slidably arranged head transversely on said blade and means for removably sustaining the head on the blade.

MARTIN A. SHARAR.